US008873933B2

(12) United States Patent
Son et al.

(10) Patent No.: US 8,873,933 B2
(45) Date of Patent: Oct. 28, 2014

(54) METHOD FOR OPERATING ADDITIONAL INFORMATION OF VIDEO USING VISIBLE LIGHT COMMUNICATION AND APPARATUS FOR THE SAME

(75) Inventors: Jae-Seung Son, Suwon-si (KR); Eun-Tae Won, Seoul (KR); Tae-Han Bae, Seongnam-si (KR); Dae-Seok Kim, Seoul (KR); Joon-Ho Park, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 732 days.

(21) Appl. No.: 12/576,770

(22) Filed: Oct. 9, 2009

(65) Prior Publication Data

US 2010/0092152 A1 Apr. 15, 2010

(30) Foreign Application Priority Data

Oct. 9, 2008 (KR) ........................ 10-2008-0099290

(51) Int. Cl.
| | |
|---|---|
| H04N 9/80 | (2006.01) |
| H04N 21/4722 | (2011.01) |
| H04N 21/236 | (2011.01) |
| H04N 21/41 | (2011.01) |
| H04N 5/44 | (2011.01) |
| H04N 21/434 | (2011.01) |
| H04N 21/235 | (2011.01) |
| G06F 3/038 | (2013.01) |
| H04N 21/435 | (2011.01) |

(52) U.S. Cl.
CPC ......... *H04N 21/435* (2013.01); *H04N 21/4722* (2013.01); *H04N 21/23614* (2013.01); *H04N 21/4126* (2013.01); *H04N 5/4403* (2013.01); *H04N 21/4348* (2013.01); *H04N 21/235* (2013.01); *G06F 3/0386* (2013.01)
USPC ..................................................... 386/248

(58) Field of Classification Search
USPC ....................................................... 386/248
See application file for complete search history.

(56) References Cited

U.S. PATENT DOCUMENTS

| | | | | |
|---|---|---|---|---|
| 5,721,583 | A * | 2/1998 | Harada et al. ............... | 725/24 |
| 2002/0144273 | A1* | 10/2002 | Reto ............................ | 725/86 |
| 2002/0157104 | A1* | 10/2002 | Nakada et al. ............... | 725/97 |
| 2004/0061797 | A1* | 4/2004 | Takahashi et al. ..... | 348/333.01 |
| 2004/0073646 | A1* | 4/2004 | Cho et al. .................... | 709/223 |
| 2006/0050090 | A1* | 3/2006 | Ahmed et al. ............... | 345/660 |
| 2006/0129908 | A1* | 6/2006 | Markel .................... | 715/500.1 |
| 2007/0024571 | A1* | 2/2007 | Maniam et al. ............ | 345/102 |
| 2007/0076262 | A1* | 4/2007 | Umeda et al. ............. | 358/3.28 |
| 2008/0133604 | A1* | 6/2008 | Kim ........................ | 707/104.1 |
| 2009/0002265 | A1* | 1/2009 | Kitaoka et al. ................ | 345/4 |
| 2009/0028093 | A1* | 1/2009 | Shon et al. ................... | 370/328 |

* cited by examiner

*Primary Examiner* — Thai Tran
*Assistant Examiner* — Jose Mesa
(74) *Attorney, Agent, or Firm* — The Farrell Law Firm, P.C.

(57) ABSTRACT

A method for operating additional information related to video displayed on a display device by a terminal apparatus communicable with the display device, includes receiving first data related to the video from the display device, displaying information included in the first data on a built-in display and receiving at least one of the displayed information, which is selected by a user, generating an additional information request message for requesting the information selected by the user, sending the additional information request message to the display device, receiving from the display device second data including additional information corresponding to the additional information request message, and displaying the second data on the built-in display.

19 Claims, 15 Drawing Sheets

METHOD FOR OPERATING ADDITIONAL INFORMATION OF VIDEO USING VISIBLE LIGHT COMMUNICATION AND APPARATUS FOR THE SAME

PRIORITY

This application claims priority under 35 U.S.C. §119(a) to a Korean Patent Application filed in the Korean Intellectual Property Office on Oct. 9, 2008 and assigned Serial No. 10-2008-0099290, the contents of which are incorporated herein by reference.

BACKGROUND OF THE INVENTION

1. Field of the Invention

The present invention relates generally to a method and apparatus for playing back videos, and more particularly, to a method and apparatus for providing additional information contained in videos.

2. Description of the Related Art

In general, Moving Picture Expert Group-4 (MPEG-4) refers to a digital bit stream protocol that can encode such contents as audio, video, and objects, and indicates a protocol capable of digitally representing and delivering a variety of multimedia contents. Since MPEG-4 is an object-based representation system, scene description information is needed to compose scenes. Such description information is called Binary Format for Scenes (BIFS). BIFS composes scenes by composing and mixing objects, moves MPEG-4 objects by describing interfaces with objects, and enables providing content for objects corresponding to a user's input among BIFS nodes.

FIG. 1 illustrates a structure of a conventional broadcast terminal. Referring to FIG. 1, the broadcast terminal includes a demultiplexer (DEMUX) 200, a video decoder 210, an audio decoder 220, a data decoder 230, a display 240 and a speaker 250.

The demultiplexer 200 separates video, audio, and data information individually from an MPEG Transport Stream (TS) received from the outside, and provides the separated information to the video decoder 210, the audio decoder 220, and the data decoder 230, respectively.

The video decoder 210 decodes the encoded video information, the audio decoder 220 decodes the encoded audio information, and the data decoder 230 decodes the encoded data information.

The display 240 converts the video information decoded by the video decoder 210 into a visible light signal and provides it to a user. The speaker 250 converts the audio information decoded by the audio decoder 220 into an audible signal and offers it to the user. When the video and/or audio information is composed based on objects, the display 240 and the speaker 250 may further exhibit information about the composition. In particular, the display 240 may further include an input interface (e.g., a touch screen module) through which objects included in video can be selected, and may receive specific selected objects contained in video or audio information through the input interface. If a specific object is selected by the user through the input interface, data corresponding to the selected object can be provided to the user through the display 240 and/or the speaker 250.

FIG. 2 illustrates an operation of a conventional broadcast terminal. Referring to FIG. 2, the broadcast terminal receives an MPEG TS in step 310, and then separates video, audio and data information individually from the received MPEG TS and decodes the separated information separately in step 320.

The decoded video and audio information is provided to the user through the display 240 and the speaker 250 in step 330. Here, the display 240 outputs the video information, which includes information indicating that the video or audio information is composed based on objects.

If an interaction with the broadcast terminal occurs from the user in step 340, the display 240 or the speaker 250 receives data information corresponding thereto from the data decoder 230 and then provides the data information to the user in step 350. However, if no such interaction occurs with a user, the operation proceeds to step 360, where the operation is completed.

Steps 310 to 350 stated above are repeated until a broadcast function of the broadcast terminal is completed.

Such BIFS-based broadcast service is generally provided to portable terminals capable of supporting Internet Protocol Television (IPTV) or Digital Multimedia Broadcast (DMB) service. With the portable terminal, the user may select menus and click buttons while enjoying content, and thus directly issue commands or control the portable terminal.

Meanwhile, a large-scale display device intended for a plurality of users, such as IPTV or large-sized advertising display board, does not include a separate input interface (e.g., a touch screen module) through which the user can directly select objects contained in video or audio information, and its operation is generally controlled using a remote control device (e.g. a remote controller). Therefore, the large-scale display device is designed to create a separate menu for selecting objects, provide a list of data information corresponding to the objects, and receive specific objects selected by the user. Thus, with use of the remote control device, the user checks a list displayed on a screen of the display device by selecting a menu for object selection, and reads data information by selecting a specific object from the list. In this case, the user must inconveniently select a plurality of menus to select a desired specific menu, and the interim menus displayed on the screen of the display device may damage the video.

SUMMARY OF THE INVENTION

An aspect of the present invention is to address at least the above-mentioned problems and/or disadvantages and to provide at least the advantages described below. Accordingly, an aspect of the present invention provides a method and apparatus for allowing an individual to receive desired additional information through a simple manipulation of a remote control device, using a display device that provides videos to a plurality of users and supports Visible Light Communication (VLC).

According to the present invention, there is provided a method for operating additional information related to video displayed on a display device by a terminal apparatus communicable with the display device, including receiving first data related to the video from the display device, displaying information included in the first data on a built-in display and receiving at least one of the displayed information, which is selected by a user, generating an additional information request message for requesting the information selected by the user, sending the additional information request message to the display device, receiving from the display device second data including additional information corresponding to the additional information request message, and displaying the second data on the built-in display.

According to the present invention, there is provided a terminal apparatus communicable with a display device, for providing additional information related to video displayed on the display device, including an input interface for receiving a selection from a user, a communication unit for receiving first data related to the video from the display device, sending an additional information request message generated in response to the selection from the user, and receiving second data that the display device sends in response to the additional information request message, a data processor for generating the additional information request message for requesting information selected in response to the selection from the user, and extracting additional information corresponding to the additional information request message from the second data received from the display device, and a built-in display for displaying information included in the first data and the extracted additional information.

According to the present invention, there is provided a method for operating additional information related to video displayed on a display device by a terminal apparatus communicable with the display device, including receiving first data including a scene descriptor identifier for identifying a scene from the display device upon a change in the scene of the video displayed on the display device, receiving an additional information request related to the video from the user, generating a first request message including the scene descriptor identifier at a time when the additional information request is received, and a terminal identifier assigned to the terminal apparatus, sending the first request message to the display device; receiving second data including at least one additional information related to the scene descriptor identifier, and displaying the second data on the built-in display.

According to the present invention, there is provided a terminal apparatus communicable with a display device, for providing additional information related to video displayed on the display device, including an input interface for receiving a selection from a user, a communication unit for receiving first data including a scene descriptor identifier for identifying a scene from the display device upon a change in the scene of the video displayed on the display device, sending a first request message generated in response to the selection from the user, and receiving second data from the display device in response to the first request message, a data processor for checking the scene descriptor identifier at a time when the selection from the user is received, generating a first request message including the checked scene descriptor identifier and a terminal identifier assigned to the terminal apparatus, and extracting the at least one additional information from the second data received from the display device, and a built-in display for displaying the at least one additional information.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF THE EMBODIMENTS

Embodiments of the present invention will be described in detail with reference to the accompanying drawings. The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for the sake of clarity and conciseness.

The present invention provides a method and apparatus capable of providing additional information related to an object(s) of interest to a user and on the screen the user is watching, to a plurality of users using VLC. In a DMB service including the conventional BIFS, a user acquires additional information through a link of information included or indicated in an MPEG TS, by selecting objects contained in video and performing separate interaction on selected objects.

Figure 1:
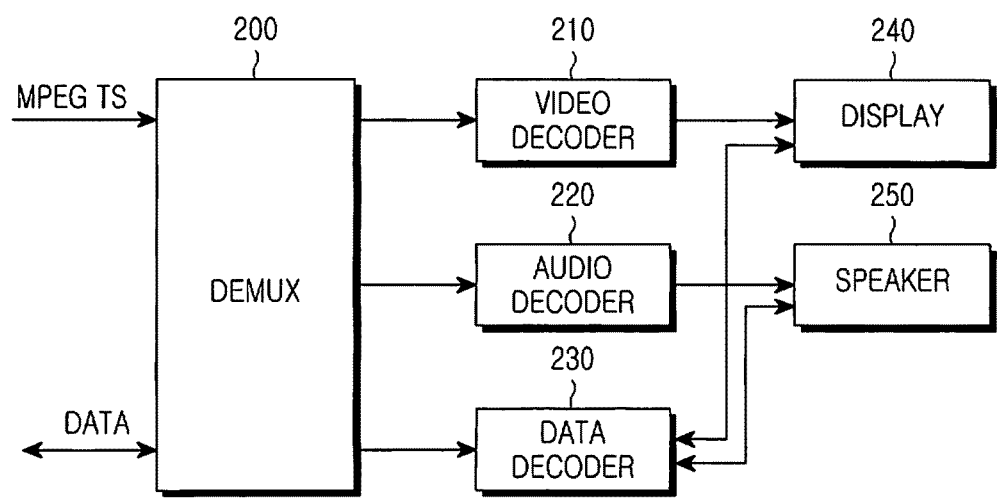
FIG. 1 illustrates a structure of a conventional broadcast terminal.
Figure 2:
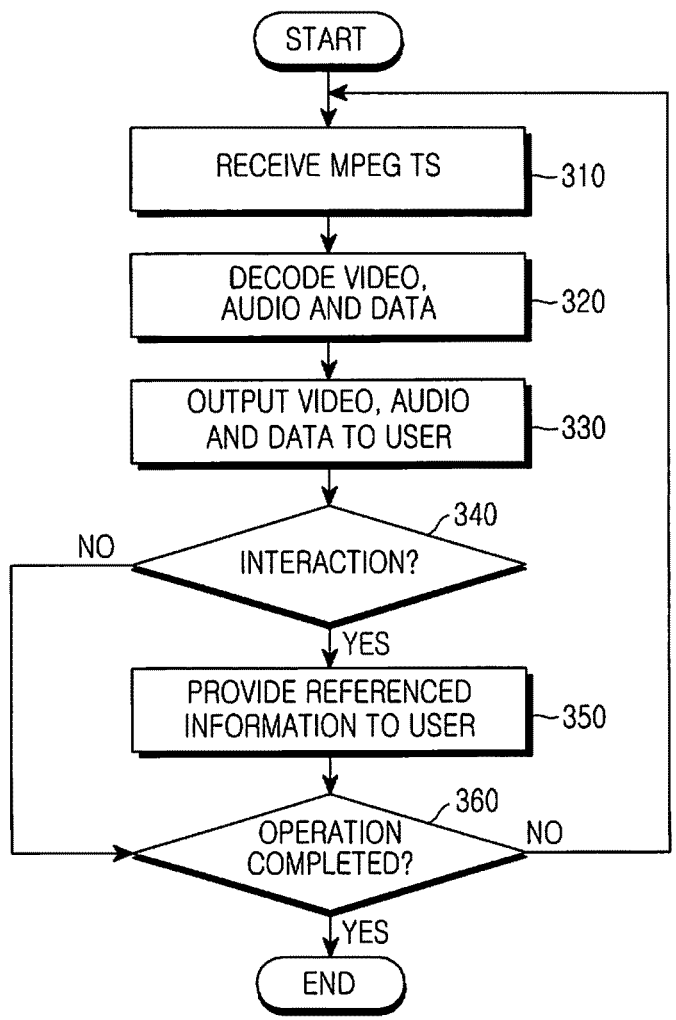
FIG. 2 illustrates an operation of a conventional broadcast terminal.
Figure 3:
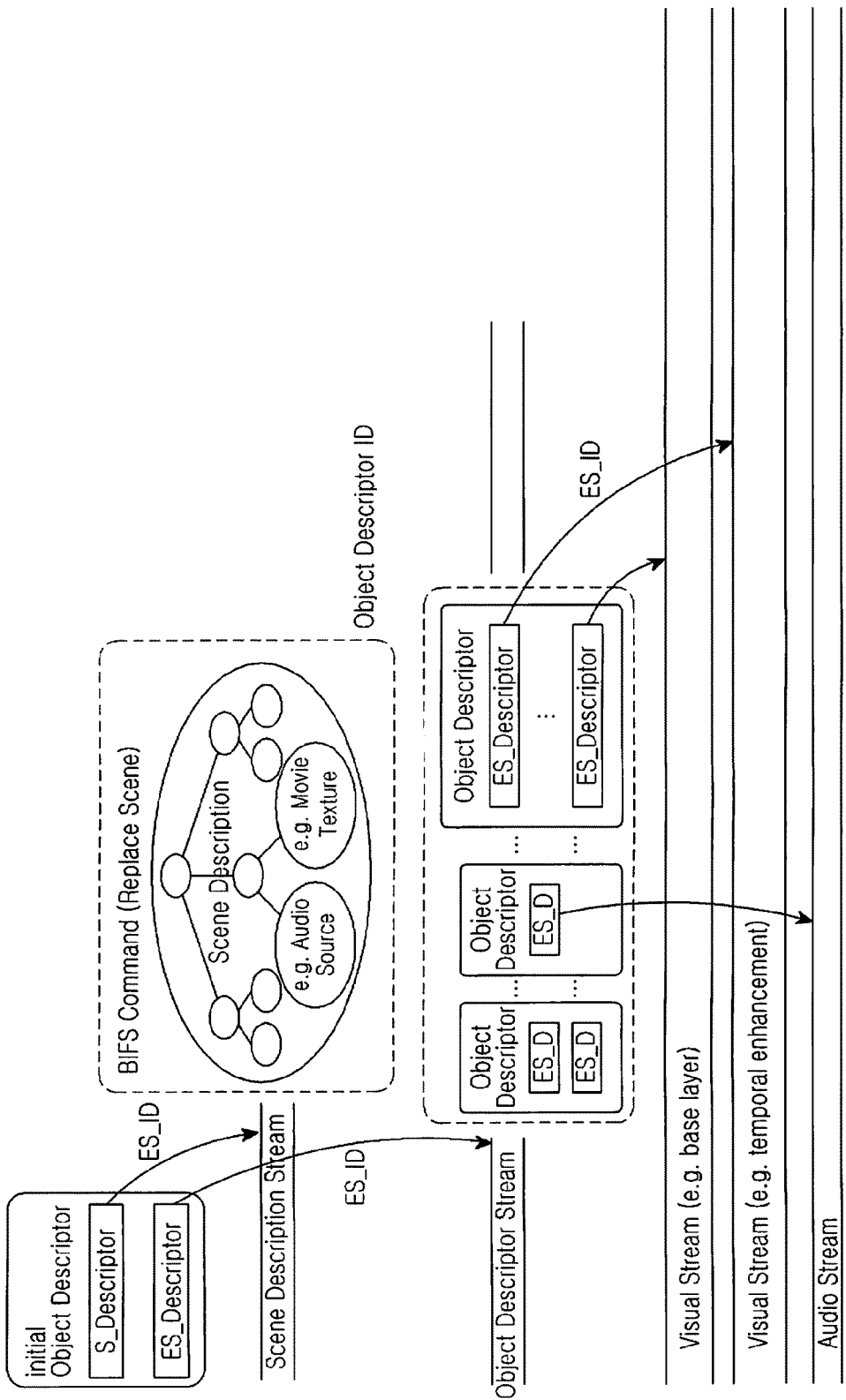
FIG. 3 illustrates a structure of a BIFS frame used in the present invention.

FIG. 3 illustrates a BIFS frame used in the present invention. An Initial Object Descriptor (IOD) includes information about the data including an Elementary Stream (ES). The ES includes a scene descriptor and an object descriptor. The scene descriptor, which stores scene composition information, includes information about when and where objects should be located, and also includes link information indicating a position where additional information for the objects is stored. The object descriptor stores a position of video and audio information composing a scene.

Figure 4:
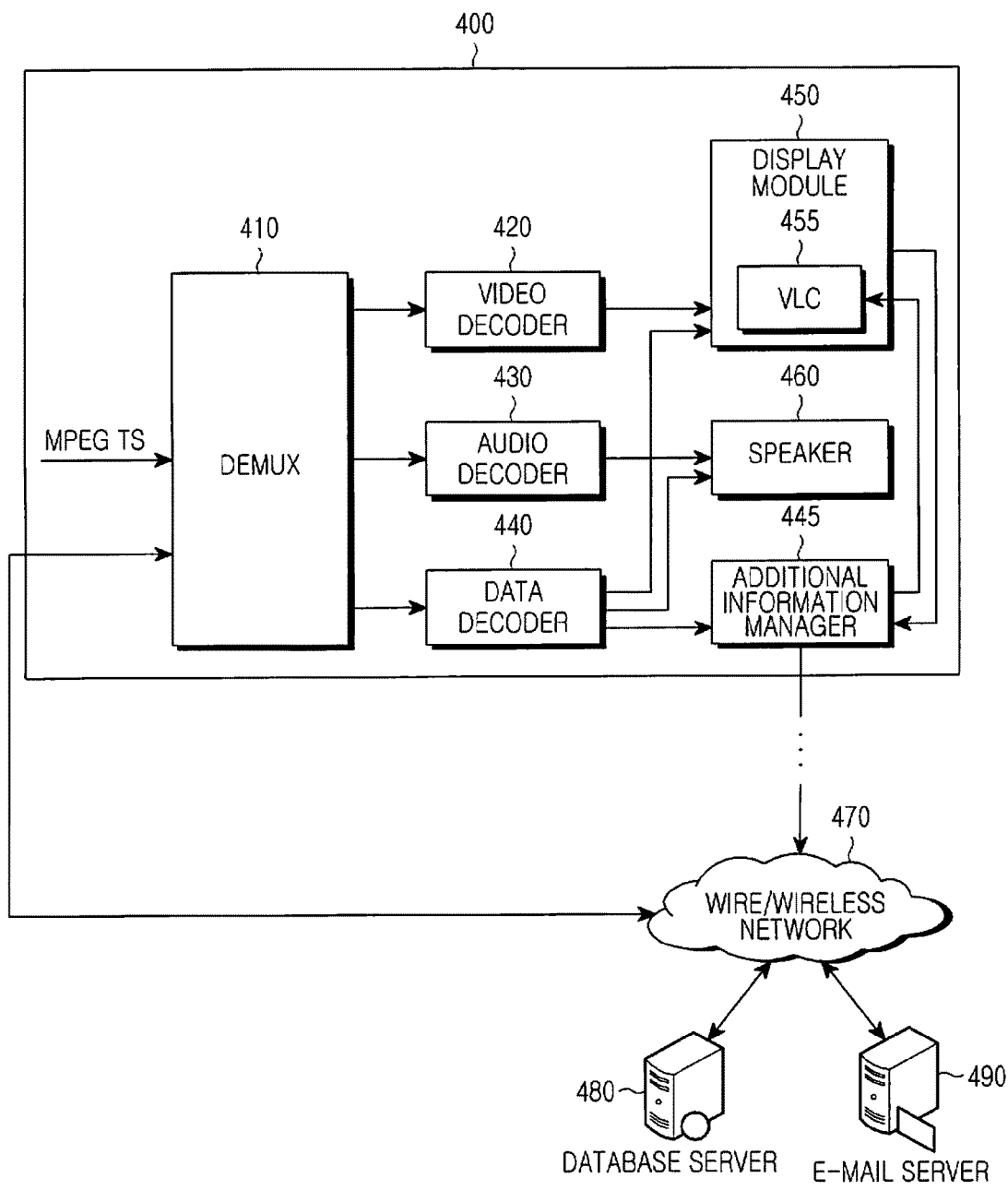
FIG. 4 illustrates an apparatus for providing additional information for a video according to the present invention.

FIG. 4 illustrates a display device according to the present invention. Referring to FIG. 4, the display device 400 includes a demultiplexer (DEMUX) 410, a video decoder 420, an audio decoder 430, a data decoder 440, an additional information manager 445, a display module 450 with a VLC module 455, and a speaker 460.

The demultiplexer 410 separates a video data stream, an audio data stream, and a data stream with additional information included in the video or audio information, individually from an MPEG TS received from the exterior.

The video decoder 420 generates a video signal by decoding the video data steam according to the MPEG video coding standard, and the audio decoder 430 generates an audio signal by decoding the audio data stream according to the MPEG audio coding standard. While the video decoding and audio decoding are performed based on the MPEG standard, the present invention is not limited to this embodiment and can be applied as long as video and audio information can be decoded.

The data decoder 440 decodes the data stream into data with additional information contained in the video or audio information, and provides the decoded data to the display module 450 or the VLC module 455. The additional information includes information about at least one object contained in the video. For example, the additional information may include an Identifier (ID) indicating a video frame in which the object is included, information about a position where the object is presented within the video frame, an ID of the object, a name of the object, and detailed information about the object.

The display module 450 displays the video signal provided from the video decoder 420. When a user requests the display module 450 to display additional information for an object contained in video, the display module 450 may receive the additional information for the object from the data decoder 440 and display the received additional information.

The speaker 460 outputs the audio signal decoded by the audio decoder 430.

The VLC module 455 generates a message or data including information for identifying an object among the additional information, and outputs the generated message or data through a visible light signal. The information for identifying an object includes a scene descriptor ID indicating a video frame where the object is contained, information about a position where the object is prepared in the video frame, an ID of the object, resolution information of the display module 450, a list of additional information included in the video frame, and an additional information ID.

Further, the VLC module 455 may receive a visible light signal from a remote additional information-providing terminal, and determine a position of a region where the visible light is received. Based on a VLC protocol, the VLC module 455 receives a message or data from the additional information providing terminal, and checks information included in the message or data, e.g., a scene descriptor ID, an additional information ID, a coordinate value of a region selected by a user, and a terminal ID. The VLC module 455 provides the position of the region where the visible light is received and the information included in the message or data to the additional information manager 445.

The additional information manager 445 manages the additional information in the display device 400. Specifically, the additional information manager 445 generates a matching table by extracting only the data information corresponding to the additional information from the scene descriptor. The matching table stores information as to the position and the type of information located on the screen based in the data decoded by the data decoder 440. Since the picture played back in the display module 450 and the picture given when a menu is selected in a remote control device may be different from each other, the additional information manager 445 manages the additional information by generating a scene descriptor ID.

In addition, since the display module 450 and the remote control device may be different in resolution, resolution information is also stored to provide resolution information of the display module 450 to the remote control device. Upon request of the VLC module 455, the additional information manager 445 may check and provide a scene descriptor ID, resolution information, an additional information list, and additional information.

Meanwhile, the data decoded by the data decoder 440 may include only the link information in which the additional information is stored, and a database server 480 or an E-mail server 490 may store the additional information. Therefore, the additional information manager 445 may access the database server 480 or the E-mail server 490 over a wire/wireless communication network 470.

Figure 5A:
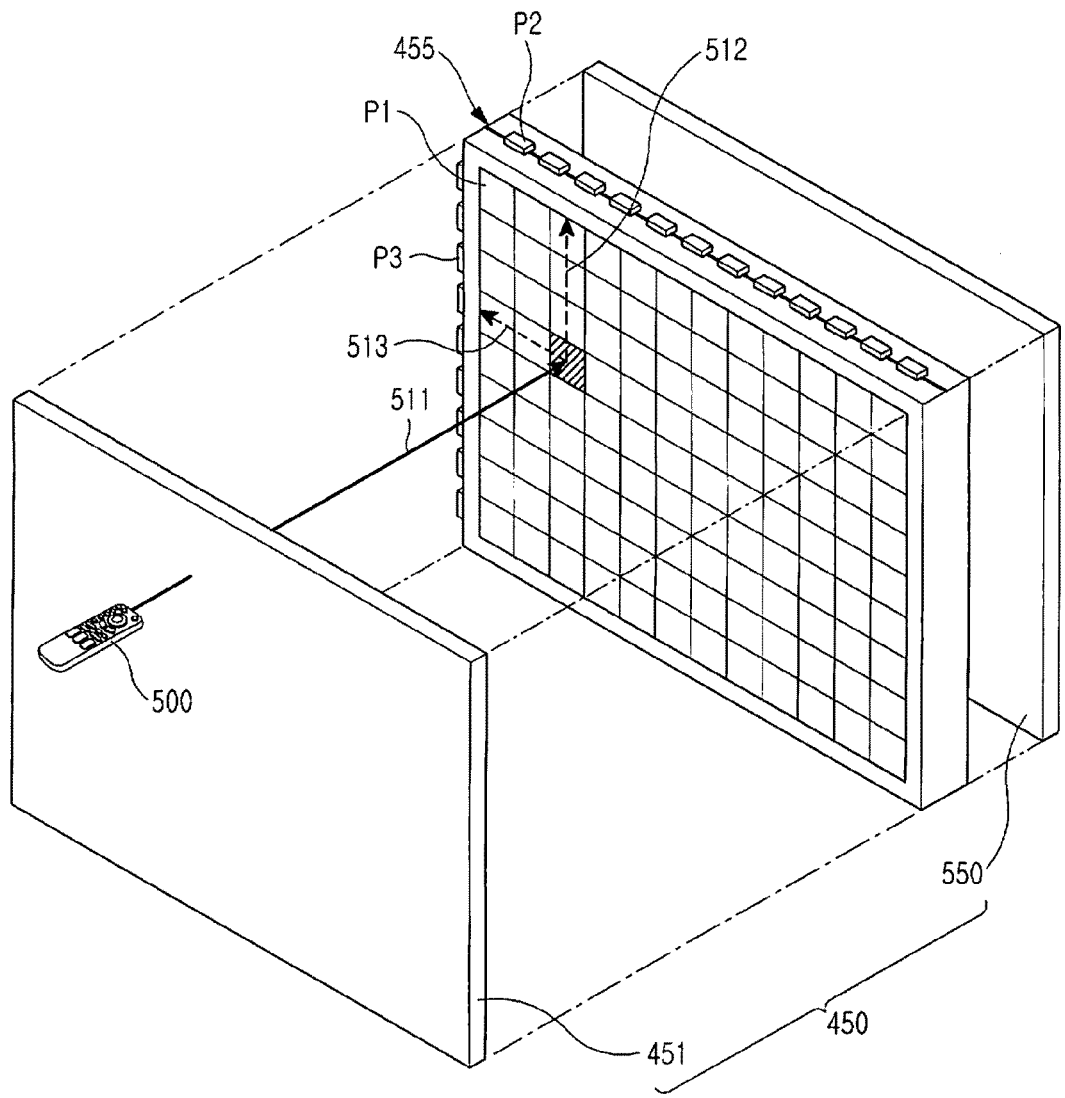
FIG. 5A illustrates a VLC module provided in an apparatus for providing additional information for a video according to the present invention.
Figure 5B:
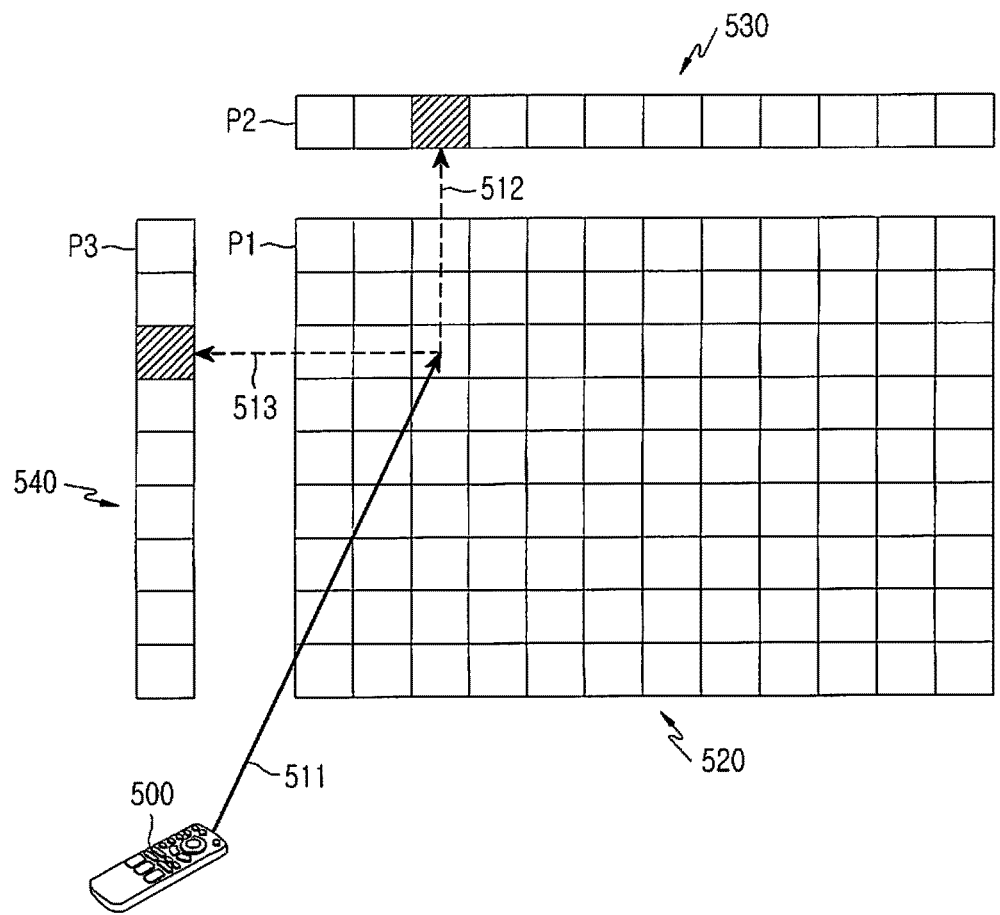
FIG. 5B illustrates a light-receiving device provided in an apparatus for providing additional information for a video according to a first embodiment of the present invention.

FIG. 5A illustrates a VLC module 455 provided in a display device according to the present invention, and FIG. 5B illustrates a plane view of FIG. 5A.

Referring to FIGS. 5A and 5B, the VLC module 455 may be installed in the display module 450. For example, the display module 450 may be a Liquid Crystal Display (LCD) display module that includes a liquid crystal panel 451 and a backlight unit 550, and the VLC module 455 includes a light receiving device (shown by 520, 530 and 540) installed between the liquid crystal panel 451 and the backlight unit 550 in order to receive visible light signals. The VLC module 455 may further include a light-transmitting device (not shown) for transmitting visible light signals. Preferably, the light-transmitting device may be prepared using the backlight unit 550 composed of Light Emitting Diodes (LEDs). For example, the light-transmitting device may be realized by modulating a visible light signal based on a VLC protocol and providing the modulated visible light signal to a plurality of LEDs installed in the backlight unit 550.

The light-receiving device of the VLC module 455 includes a light splitting array 520 and light receiving arrays 530 and 540 for detecting visible light split by the light splitting array 520.

The light splitting array 520 includes a plurality of light splitters, which are arranged in association with a number of pixel units and separated so that segments of visible light 511 that are input to associated light splitters, passing through the display module 450, are orthogonal to one other.

The light receiving arrays 530 and 540 include light receiving elements such as photodiodes, and are located at the circumferential side or the back of the light splitting array 520 to detect visible light split by the light splitting array 520. The light receiving arrays 530 and 540 may be located at the circumferential side of the light splitting array 520 as illustrated in FIG. 5B. The light receiving arrays 530 and 540 may alternatively be located at the circumferential side and the back of the light splitting array 520. The light receiving array 540 located face to face with one side (parallel to the y-axis) of the light splitting array 520 is composed of row units $P_3$ that are one-to-one associated with the units $P_1$ constituting rows of the light splitting array 520, and receives a part 513 of the visible light split by the light splitting array 520. The light receiving array 530 located face to face to another side (parallel to the x-axis) of the light splitting array 520 is composed of column units $P_2$ that are one-to-one associated with the units $P_1$ constituting columns of the light splitting array 520, and receives the split visible light 512.

Figure 5C:
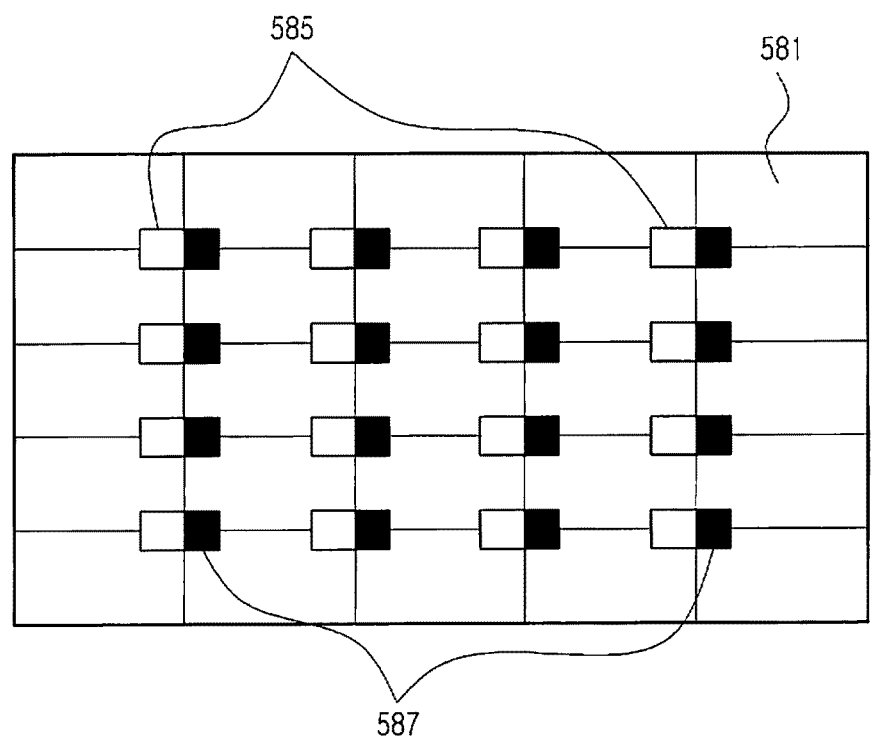
FIG. 5C illustrates a light-receiving device provided in an apparatus for providing additional information for a video according to a second embodiment of the present invention.

In a light-receiving device provided in an apparatus for providing additional information for a video according to a second embodiment of the present invention, the light receiving device of the VLC module 455 may include light receiving elements 585 prepared individually in a number pixel units 581 as illustrated in FIG. 5C. When the additional information-providing terminal directly checks and provides coordinates of a region selected by a user, the VLC module 455 does not need to check coordinates of the region indicated by the additional information providing terminal. Therefore, when the additional information providing terminal directly transmits coordinates, the light receiving device of the VLC module 455 may include light receiving elements 595 prepared in a frame 591 on the bottom of the liquid crystal panel 451 as illustrated in a third embodiment of the light receiving device of the VLC module 455 in FIG. 5D.

Figure 5D:
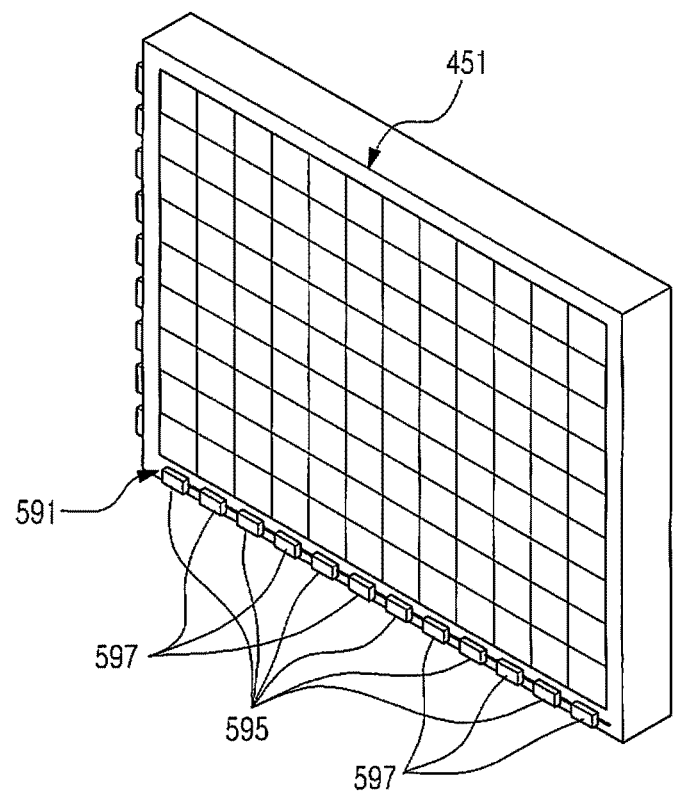
FIG. 5D illustrates a light-receiving device provided in an apparatus for providing additional information for a video according to a third embodiment of the present invention.

While it has been described that the light transmitting device of the VLC module 455 is realized using an LED backlight, the light transmitting device may include light emitting elements 587 prepared adjacent to the light receiving elements 585 as shown in FIG. 5C, or may include light emitting elements 597 prepared adjacent to the light receiving elements 595 as shown in FIG. 5D.

Figure 6:
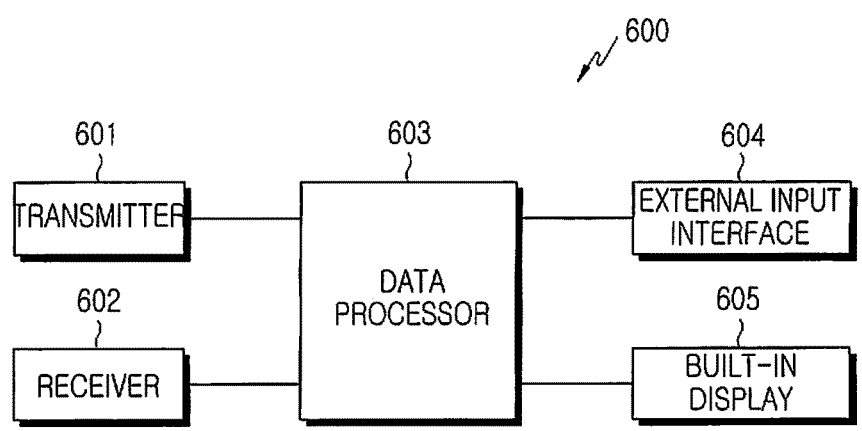
FIG. 6 illustrates a terminal for providing additional information according to the present invention.

FIG. 6 illustrates a terminal for providing additional information according to the present invention. The terminal for providing additional information 600 includes a transmitter 601 and a receiver 602 for performing data exchange with a display device, a data processor 603 for processing data generated in the data exchange process, an external input interface 604 for receiving a selection from a user, and a built-in display 605 for displaying the processed data.

The data processor 603 processes a video signal presently being played back in the display device 400, provides the processed video signal to the built-in display 605, and may check, from the data provided from the display device 400, data that includes a scene descriptor ID indicating the current frame of the video, an additional information list, an additional information ID, a resolution of the display device, and additional information. The data processor 603 may generate data needed to send a request for additional information to the display device 400, for example, the data that includes a scene descriptor ID, a coordinate value of a region selected by a user, an additional information ID, and a terminal ID.

The additional information-providing terminal may be provided in a common mobile communication terminal supporting audio/video communication, and such a mobile communication terminal may be implemented to perform an operation of a remote control device as well as the common mobile communication service-related operation.

A detailed description will now be made of an operating method for additional information for a video according to first to fifth of the present invention and associated operations of the display device and the additional information-providing terminal.

First Embodiment

Figure 7:
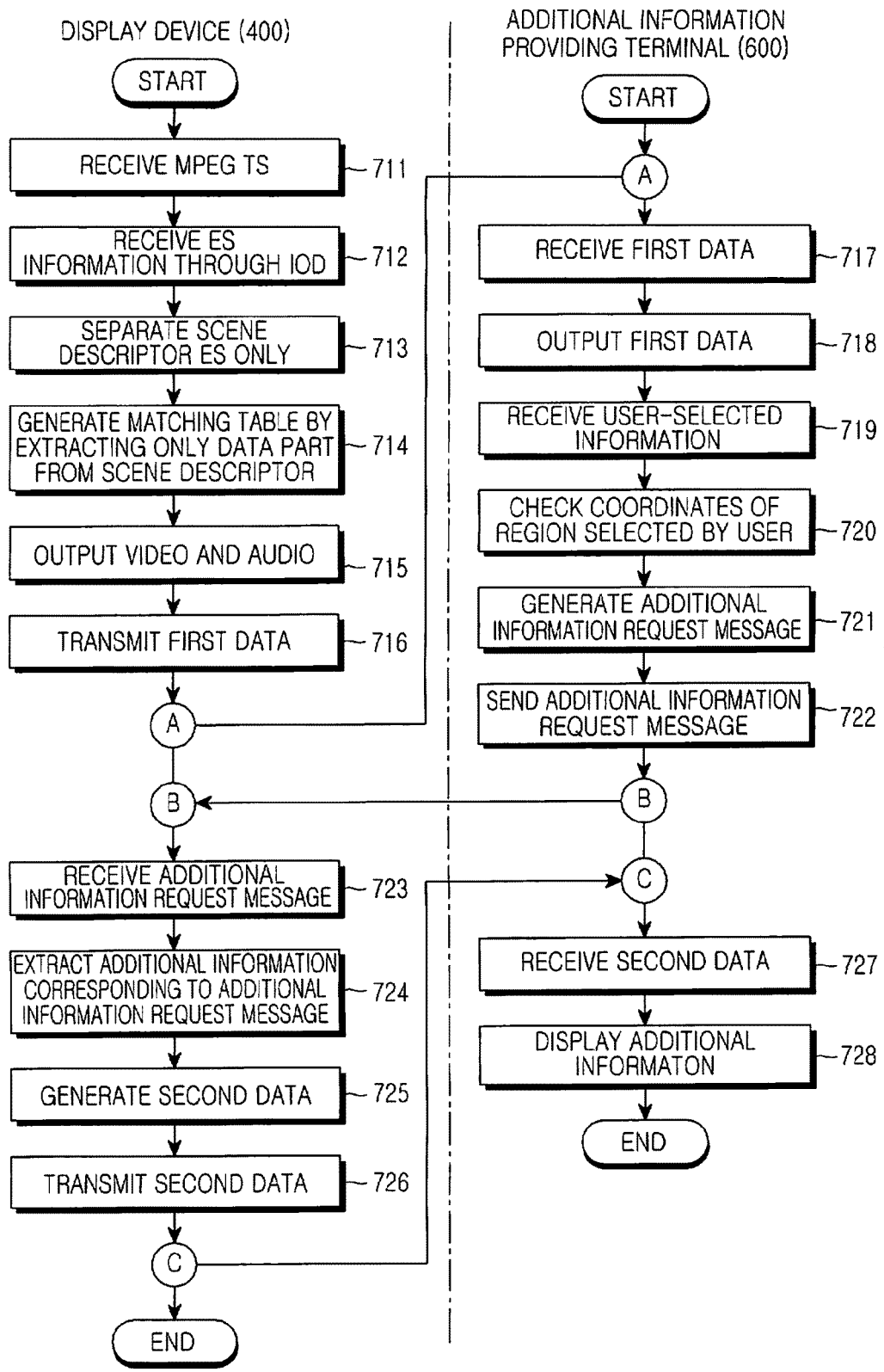
FIG. 7 illustrates an operating method for additional information for a video according to a first and a second embodiment of the present invention.

FIG. 7 illustrates an operating method for additional information for a video according to a first embodiment of the present invention.

Referring to FIG. 7, the additional information providing apparatus for a video, or the display device 400, receives an MPEG TS from the exterior in step 711.

In step 712, the demultiplexer 410 checks ES information through an IOD included in the received MPEG TS and separates the MPEG TS into a video data stream, an audio data stream, and a data stream. The demultiplexer 410 delivers the separated information to the video decoder 420, the audio decoder 430 and the data decoder 440, respectively.

In step 713, the data decoder 440 decodes the encoded data, separates only the scene descriptor ES from the decoded data, and transfers it to the additional information manager 445.

In step 714, the additional information manager 445 generates a matching table by extracting only the data information corresponding to additional information from the scene descriptor. For example, the additional information may include shopping mall information related to a material object (e.g., a handbag) included in video, or personal information of a person object included in video.

In step 715, the video decoder 420 and the audio decoder 430 decode the video information and the audio information, both of which it provides to the display module 450 and the speaker 460, respectively, and the display module 450 and the speaker 460 output the video information and the audio information, respectively.

In step 716, the additional information manager 445 generates a scene descriptor ID and provides it to the VLC module 455 along with the video information. The VLC module 455 transmits first data including a scene descriptor ID of video to a remote additional information-providing terminal 600 at an output timing of the video displayed by the display module 450. In response, the remote additional information-providing terminal 600 receives the first data from the display device 400 in step 717. The additional information providing terminal 600 may be a terminal that can receive and display additional information and can also output video information and audio information. Whether the terminal will output the video information and the audio information can be set by a user's selection.

When output of the video information and the audio information is requested, the video information and the audio information being output through the display device 400 may be included in the first data and then transmitted in step 716, and the first data including the video information and the audio information is received in step 717. In step 718, the data processor 603 in the additional information providing terminal 600 detects the video information and the audio information, both of which it outputs to the built-in display 605.

As the user checks video being output through the built-in display 605 provided in the additional information providing terminal 600 and selects any one region of the video using the external input interface 604 (e.g., a touch screen, an external input key, or a mouse), the additional information providing terminal 600 receives user's selection information in step 719.

In step 720, the data processor 603 determines a coordinate value of the region selected by the user by checking the selection information. Preferably, the coordinates of the selected region are determined considering a resolution of the display device 400 and a resolution of the built-in display 605. If the user transmits intactly the coordinates of the built-in display 605 in the additional information-providing terminal 600, the resolution of the built-in display 605 may not be precisely matched with the resolution of the display device 400 that transmitted the data.

Therefore, by comparing the resolution of the built-in display 605 in the additional information providing terminal 600 with the resolution information of the display device 400, the data processor 603 should change the coordinate value of the region that the user selected through the built-in display 605 in accord with the resolution of the display device 400, and provide the changed coordinate value to the display device 400. For that purpose, the VLC module 455 in the display device 400 further includes resolution information of the display device 400 in the first data and then transmits the first data in step 716, and the data processor 603 changes the coordinate value of the region selected through the built-in display 605 in accord with the resolution of the display device 400 in step 720.

In step 721, the data processor 603 generates an additional information request message to be sent to the display device 400. The additional information request message may include the coordinate value of the selected region, determined in step 720. When the additional information request message is generated after the user's selection information is received, the scene of the video being displayed on the display device 400 may be changed, making it impossible to provide the additional information desired by the user. To prevent this problem, the data processor 603 may further include in the additional information request message the scene descriptor ID at the time when the user's selection information was received.

In step 722, the transmitter 601 sends the additional information request message to the display device 400.

In step 723, the VLC module 455 in the display device 400 receives the additional information request message. In step 724, the additional information manager 445 checks information included in the received additional information request message. That is, the additional information manager 445 checks the coordinate value of the selected region, which is included in the additional information request message, and extracts additional information corresponding to the coordinate value.

In step 725, in order to provide the extracted additional information to the additional information-providing terminal 600, the additional information manager 445 provides the additional information to the VLC module 455, which generates second data including the additional information. In step 726, the VLC module 455 transmits the second data to the additional information providing terminal 600.

In response, the receiver 602 in the additional information-providing terminal 600 receives the second data in step 727, and the data processor 603 extracts the additional information from the received second data and displays it on the built-in display 605 in step 728.

Figure 8:
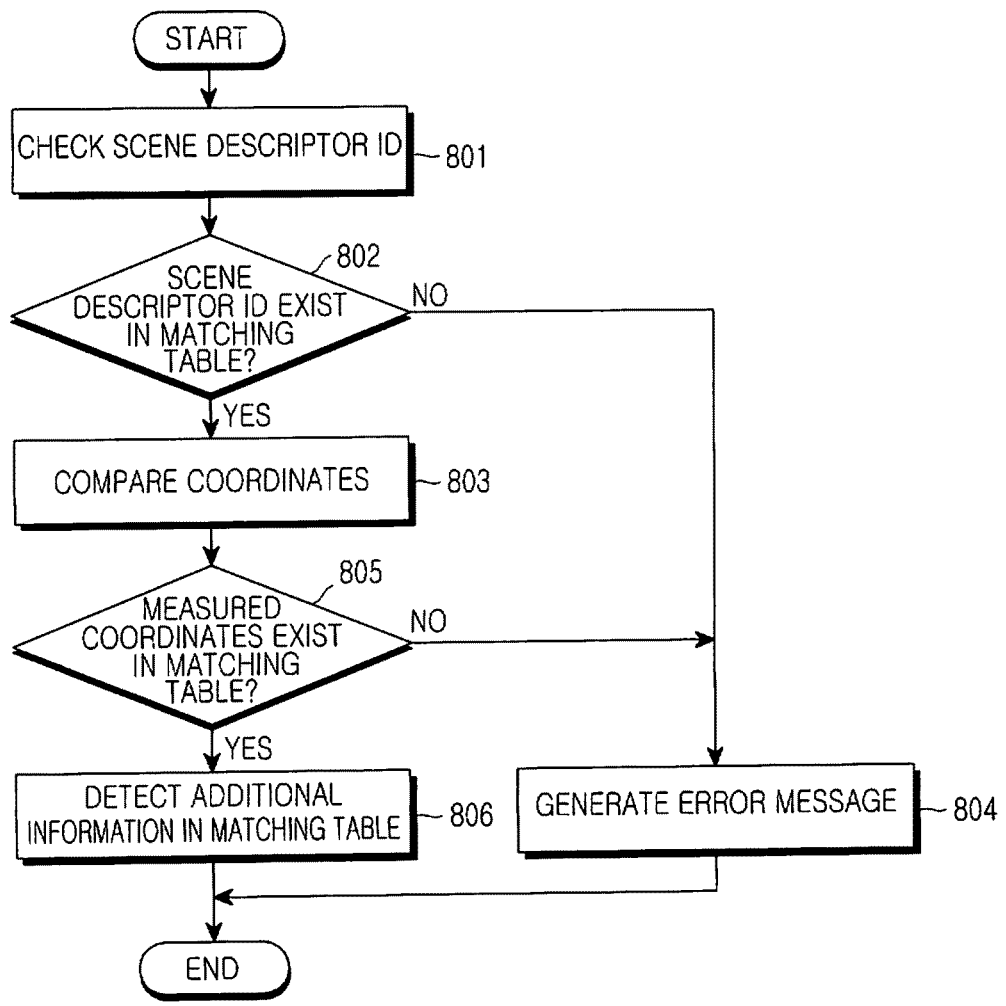
FIG. 8 illustrates the detailed process of step 725 in FIG. 7.

FIG. 8 illustrates the detailed process of step 725 in FIG. 7. Referring to FIG. 8, the additional information manager 445 checks the scene descriptor ID included in the additional information request message in step 801, and determines in step 802 whether the scene descriptor ID exists in the previously stored matching table. If the scene descriptor ID exists in the previously stored matching table, the additional information manager 445 proceeds to step 803. If the scene descriptor ID does not exist in the previously stored matching table, the additional information manager 445 proceeds to step 804.

In step 803, the additional information manager 445 compares the coordinate value of the selected region included in the additional information request message with a coordinate value in the matching table, which corresponds to the scene descriptor ID. In step 805, the additional information manager 445 determines whether the coordinate value of the selected region exists in the matching table. If the coordinate value of the selected region exists in the matching table, the additional information manager 445 proceeds to step 806. If the coordinate value of the selected region does not exist in the matching table, the additional information manager 445 proceeds to step 804.

In step 804, the additional information manager 445 generates an error message and sends it to the VLC module 455, as there is no additional information corresponding to the selected region. The VLC module 455 includes the generated error message instead of the additional information in the second data in step 725.

In step 806, the additional information manager 445 detects additional information corresponding to the coordinate value of the selected region in the matching table. The additional information includes information about an object contained in the video, or link information indicating a position where the information about the object is stored.

Second Embodiment

In the first embodiment described above and shown in FIG. 7, the first data includes video information, and after the video information is output through the built-in display in the additional information providing terminal, a region where an object (e.g., person or goods) included in the video is located is directly selected by the user. Alternatively, it is also possible to provide the additional information using a list of additional information. An operation method of providing additional information using a list of additional information according to a second embodiment is similar to that of the first embodiment except for the process of processing data. Therefore, the operation method of the second embodiment will be described with reference to FIG. 7, which also shows the operation method of the first embodiment.

In accordance with the second embodiment, the display device 400 includes a list of at least one additional information contained in the current scene in the first data and provides the first data to the additional information providing terminal 600, the user selects any one additional information from the additional information list, and the additional information providing terminal 600 may provide the selected additional information. For this purpose, in step 716, the additional information manager 445 in the display device 400 detects additional informations corresponding to the scene descriptor ID, generates a list including the detected additional informations, and provides the generated additional information list to the VLC module 455. The VLC module 455 generates and transmits first data that includes the scene descriptor ID and the additional information list corresponding to the scene descriptor ID.

In step 718, the data processor 603 in the additional information providing terminal 600 checks the additional information list and outputs it to the built-in display 605. In step 720, the data processor 603 checks additional information corresponding to the region selected by the user and detects an additional information ID indicating the additional information. In step 721, the data processor 603 generates an additional information request message including the additional information ID. In step 722, the additional information request message is sent to the display device 400 by means of the transmitter 601. In response, in step 724, the additional information manager 445 in the display device 400 checks additional information corresponding to the additional information ID and provides it to the VLC module 455.

The VLC module 455 generates second data including the checked additional information in step 725, and provides the second data to the additional information providing terminal 600 in step 726. In step 728, the data processor 603 in the additional information providing terminal 600, which has received the second data with the additional information, checks the additional information and displays the additional information on the built-in display 605.

Third Embodiment

Figure 9:
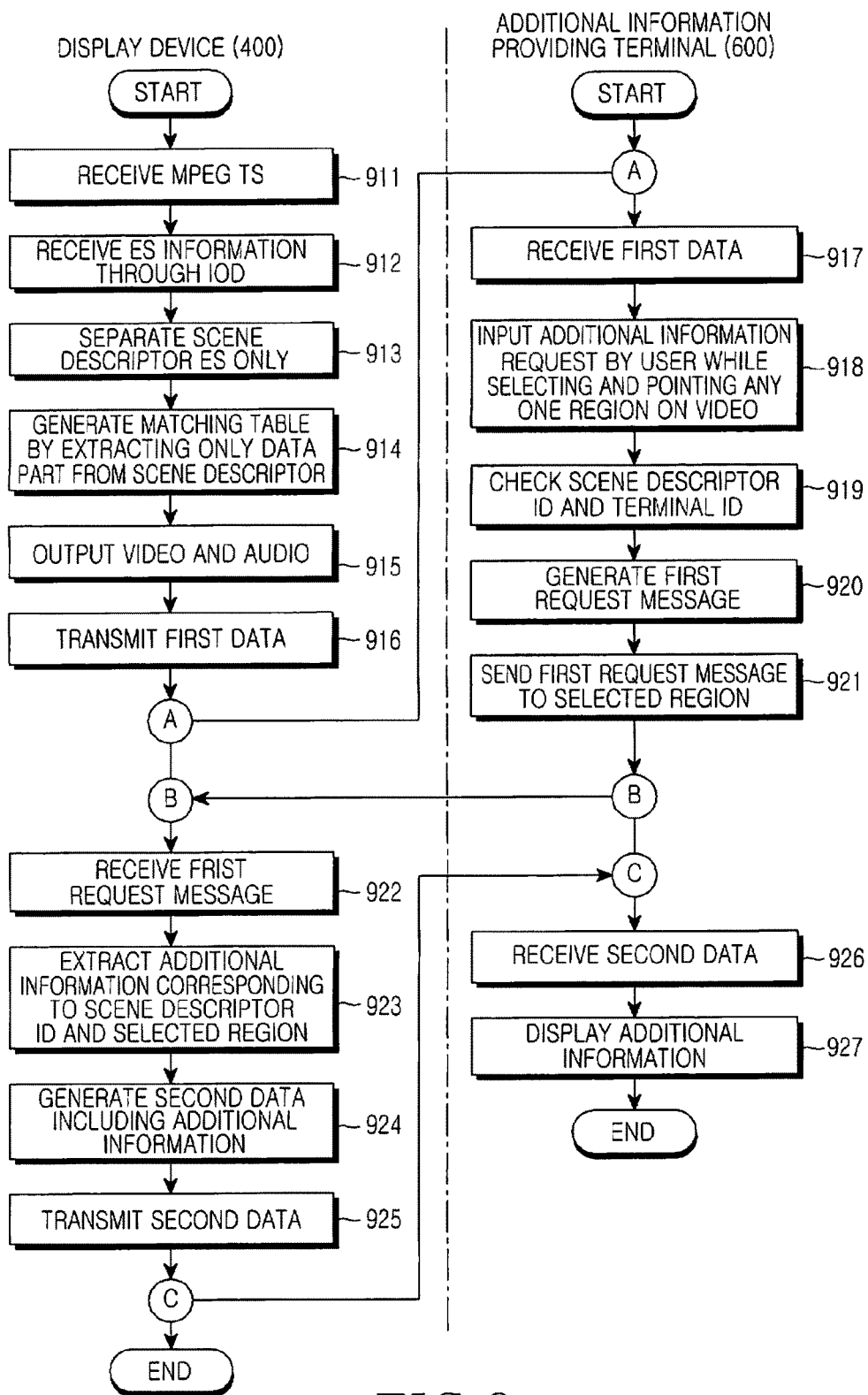
FIG. 9 illustrates an operating method for additional information for a video according to a third embodiment of the present invention.

FIG. 9 illustrates an additional information operating method according to a third embodiment of the present invention. Referring to FIG. 9, the display device 400 receives an MPEG TS from the exterior in step 911. In step 912, the demultiplexer 410 checks ES information through an IOD included in the received MPEG TS and separates the MPEG TS into a video data stream, an audio data stream, and a data stream. The demultiplexer 410 delivers the separated information to the video decoder 420, the audio decoder 430 and the data decoder 440, respectively.

In step 913, the data decoder 440 decodes the encoded data, separates only the scene descriptor ES from the decoded data, and transfers it to the additional information manager 445.

In step 914, the additional information manager 445 generates a matching table by extracting only the data information corresponding to additional information from the scene descriptor. For example, the additional information may include shopping mall information related to a material object (e.g., a handbag) included in video, or personal information of a person or object included in video.

In step 915, the video decoder 420 and the audio decoder 430 decode the video information and the audio information, both of which it provides to the display module 450 and the speaker 460, respectively, and the display module 450 and the speaker 460 output the video information and the audio information, respectively.

In step 916, the additional information manager 445 generates a scene descriptor ID and provides it to the VLC module 455 along with the video information. The VLC module 455 transmits first data including a scene descriptor ID of video to the remote additional information providing terminal 600 at an output timing of the video that the display module 450 displays. In response, the receiver 602 in the remote additional information-providing terminal 600 receives the first data from the display device 400 in step 917.

In step 918, the user checks video being output through the display device 400 and inputs an additional information request using an external input interface 604 (e.g., a touch screen, an external input key, or a mouse) in the additional information-providing terminal 600. In addition, the user may input an additional information request while selecting and pointing to any one region of the video being output through the display device 400.

In response, the data processor 603 in the additional information providing terminal 600 checks a scene descriptor ID at the time when it received an additional in formation request, and its own terminal ID in step 919, and generates a first request message including the scene descriptor ID and the terminal ID in step 920. In step 921, the data processor 603 provides the first request message to the transmitter 601, and the transmitter 601 sends the first request message to the region selected by the user.

In step 922, the VLC module 455 in the display device 400 receives the first request message through a light-receiving device prepared in the region selected by the user. In this manner, the VLC module 455 detects coordinates of the region selected by the user. For example, the first request message is sent to the display device 400 through visible light, which is reflected in row and column directions on the light splitting array 520 provided in the VLC module 455, and the reflected visible light is input to the light receiving arrays 530 and 540 located in rows and columns. The VLC module 455 determines coordinates of the region on which the visible light is incident, by checking positions on the light receiving arrays 530 and 540 where they received the visible light.

In step 923, the additional information manager 445 checks a scene descriptor ID included in the first request message and coordinates of the region selected by the user, and extracts additional information corresponding thereto. At this point, the additional information manager 455 determines whether the scene descriptor ID and the coordinates of the region selected by the user are valid. If the scene descriptor ID and the coordinates of the region selected by the user are valid, the additional information manager 455 extracts additional information corresponding thereto using the matching table. If the scene descriptor ID and the coordinates of the region selected by the user are invalid, the additional information manager 455 generates an error message.

In step 924, the additional information manager 445 provides the additional information or the error message to the VLC module 455, and the VLC module 455 generates second data including the additional information or the error message. In step 925, the VLC module 455 transmits the second data to the additional information providing terminal 600 corresponding to the terminal ID.

In step 926, the receiver 602 in the additional information-providing terminal 600 receives the second data including the additional information or the error message. In step 927, the data processor 603 checks the additional information or the error message in the second data, and displays the additional information or the error message on the built-in display 605.

Fourth Embodiment

Figure 10:
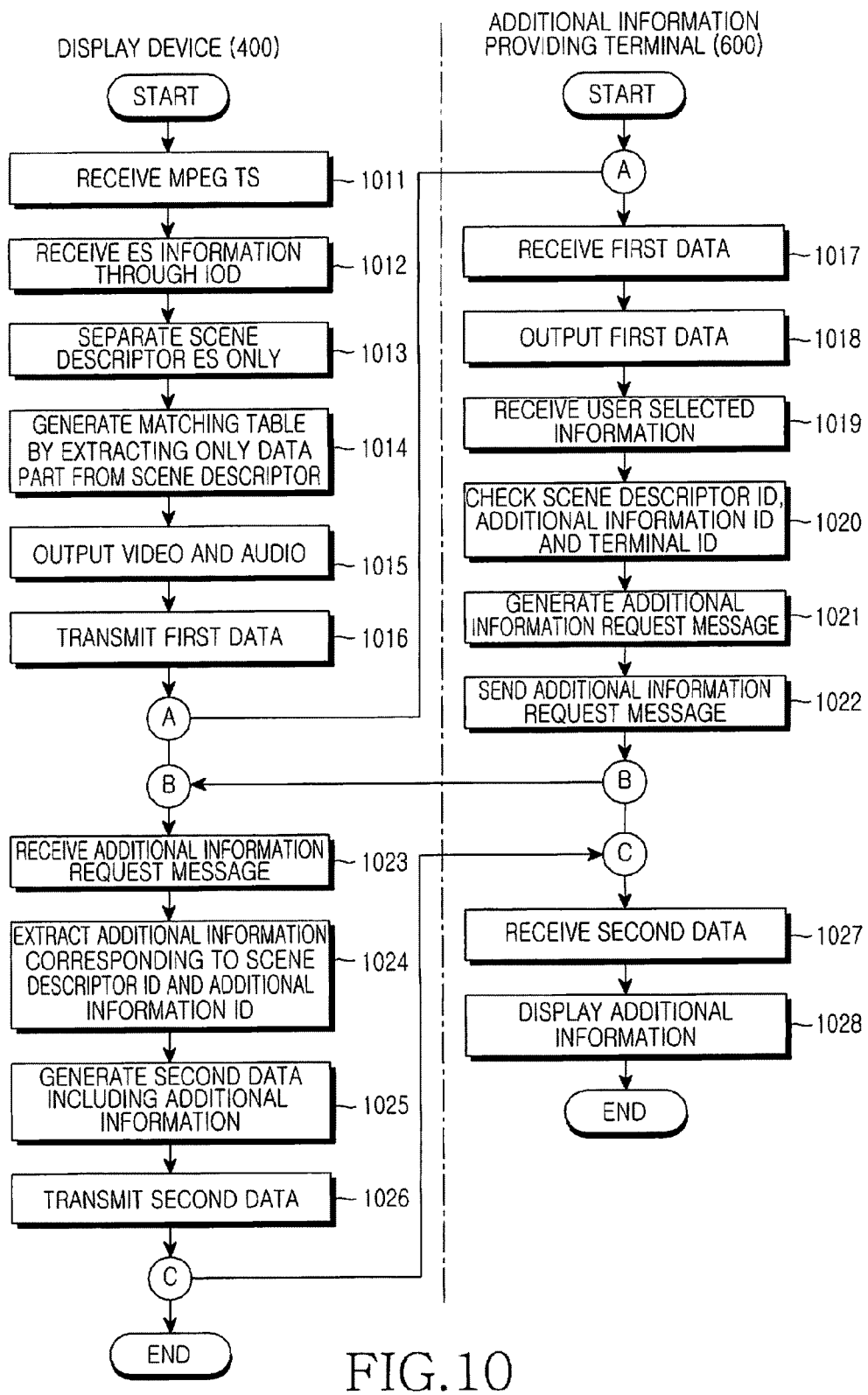
FIG. 10 illustrates an operating method for additional information for a video according to a fourth embodiment of the present invention.

FIG. 10 illustrates an additional information operating method according to a fourth embodiment of the present invention. Referring to FIG. 10, the display device 400 receives an MPEG TS from the outside in step 1011. In step 1012, the demultiplexer 410 checks ES information through an IOD included in the received MPEG TS and separates the MPEG TS into a video data stream, an audio data stream, and a data stream. The demultiplexer 410 delivers the separated information to the video decoder 420, the audio decoder 430 and the data decoder 440, respectively.

In step 1013, the data decoder 440 decodes the encoded data, separates only the scene descriptor ES from the decoded data, and transfers it to the additional information manager 445.

In step 1014, the additional information manager 445 generates a matching table by extracting only the data information corresponding to additional information from the scene descriptor. For example, the additional information may include shopping mall information related to a material object (e.g., a handbag) included in video, or personal information of a person object included in video.

In step 1015, the video decoder 420 and the audio decoder 430 decode the video information and the audio information, both of which it provides to the display module 450 and the speaker 460, respectively, and the display module 450 and the speaker 460 output the video information and the audio information, respectively.

In step 1016, the additional information manager 445 generates a scene descriptor ID and a list of additional information corresponding to the scene descriptor ID, and provides the additional information list to the VLC module 455 along with the video information. The VLC module 455 generates first data including the additional information list and transmits the first data to a remote additional information providing terminal 600 at an output timing of the video that the display module 450 displays. In response, the receiver 602 in the additional information providing terminal 600 receives the first data from the display device 400 in step 1017, and the data processor 603 detects the additional information list from the first data and displays it on the built-in display 605 in step 1018.

As the user checks video being output through the built-in display 605 provided in the additional information providing terminal 600 and selects any one additional information from the additional information list using an external input interface 604 (e.g., a touch screen, an external input key, or a mouse), the additional information providing terminal 600 receives selected additional information in step 1019.

The data processor 603 checks the scene descriptor ID, an ID of the selected additional information, and its own terminal ID in step 1020, and generates an additional information request message including the scene descriptor ID, the selected additional information's ID, and its terminal ID in step 1021. In step 1022, the transmitter 601 sends the additional information request message to the display device 400.

In step 1023, the display device 400 receives the additional information request message. In step 1024, the additional information manager 445 checks the scene descriptor ID included in the additional information request message and an ID of the additional information selected by the user, and detects additional information corresponding thereto. At this point, the additional information manager 455 determines whether the scene descriptor ID and the ID of the additional information selected by the user are valid. If the scene descriptor ID and the ID of the additional information selected by the user are valid, the additional information manager 455 extracts additional information corresponding thereto. If the scene descriptor ID and the ID of the additional information selected by the user are invalid, the additional information manager 455 generates an error message.

In step 1025, the additional information manager 445 provides the additional information or the error message to the VLC module 455, and the VLC module 455 generates second data including the additional information or the error message. In step 1026, the VLC module 455 checks the terminal ID and transmits the second data to the additional information providing terminal 600 corresponding to the terminal ID.

In step 1027, the receiver 602 in the additional information-providing terminal 600 receives the second data including the additional information or the error message. In step 1028, the data processor 603 detects the additional information or the error message from the second data and displays it on the built-in display 605.

Fifth Embodiment

Figure 11A:
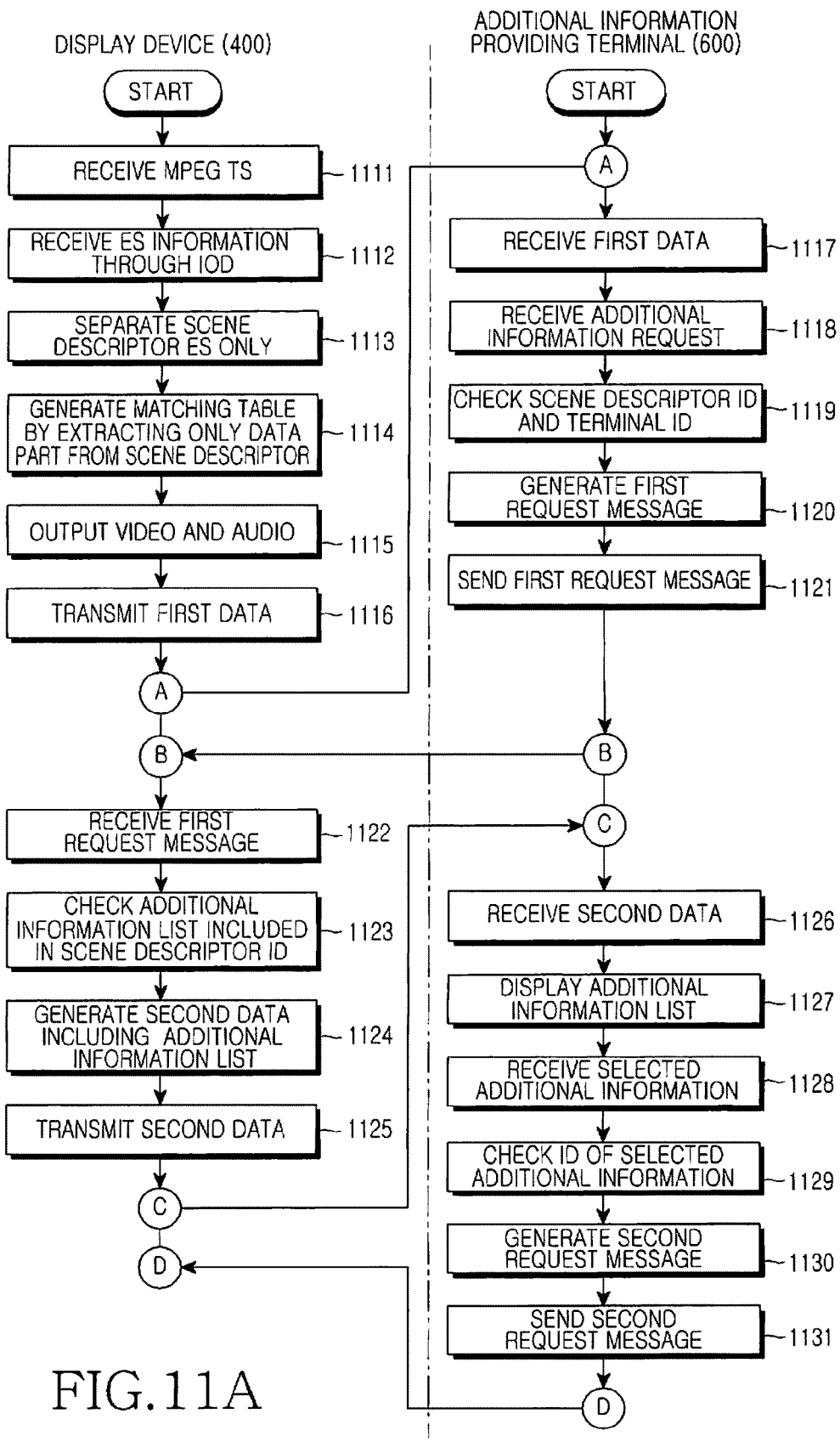
FIGS. 11A and 11B illustrate an operating method for additional information for a video according to a fifth embodiment of the present invention.
Figure 11B:
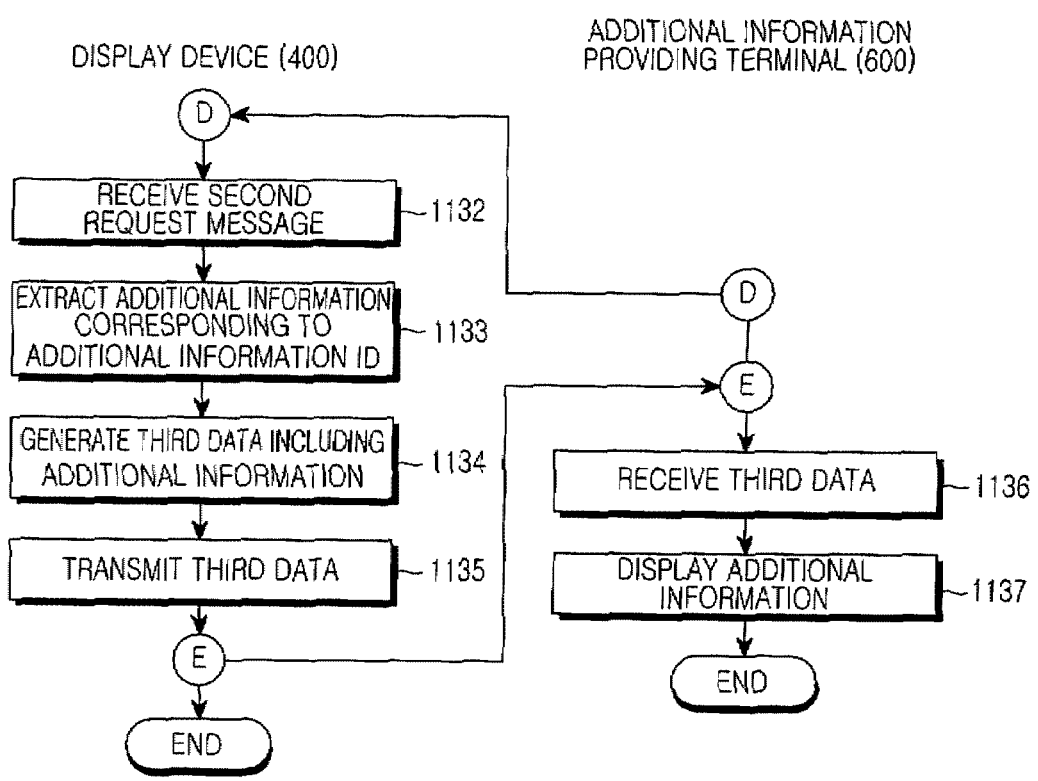

FIGS. 11A and 11B illustrate an additional information operating method according to a fifth embodiment of the present invention. Referring to FIGS. 11A and 11B, the display device 400 receives an MPEG TS from the exterior in step 1111. In step 1112, the demultiplexer 410 checks ES information through an IOD included in the received MPEG TS and separates the MPEG TS into a video data stream, an audio data stream, and a data stream. The demultiplexer 410 provides the separated information to the video decoder 420, the audio decoder 430, and the data decoder 440, respectively.

In step 1113, the data decoder 440 decodes the encoded data, separates only the scene descriptor ES from the decoded data, and transfers it to the additional information manager 445.

In step 1114, the additional information manager 445 generates a matching table by extracting only the data information corresponding to additional information from the scene descriptor. For example, the additional information may include shopping mall information related to a material object (e.g., a handbag) included in video, or personal information of a person object included in video.

In step 1115, the video decoder 420 and the audio decoder 430 decode the video information and the audio information, both of which it provides to the display module 450 and the speaker 460, respectively, and the display module 450 and the speaker 460 output the video information and the audio information, respectively.

In step 1116, the additional information manager 445 generates a scene descriptor ID and provides it to the VLC module 455 along with the video information. The VLC module 455 transmits first data including the scene descriptor ID to the remote additional information-providing terminal 600. In response, the receiver 602 in the remote additional information-providing terminal 600 receives the first data from the display device 400 in step 1117.

In the meantime, the user checks video being output through the display device 400 and receives an additional information request using the external input interface 604 (e.g., a touch screen, an external input key, or a mouse) in the additional information providing terminal 600 in step 1118.

In response, the data processor 603 checks a scene descriptor ID at the time when it received an additional information request, and its own terminal ID in step 1119, and generates a first request message including the scene descriptor ID and the terminal ID in step 1120. In step 1121, the data processor 603 provides the first request message by means of the transmitter 601.

The VLC module 455 in the display device 400 receives the first request message in step 1122. In step 1123, the additional information manager 445 checks a scene descriptor ID included in the first request message, determines at least one additional information corresponding thereto, and generates a list of at least one additional information. In step 1124, the additional information manager 445 provides the additional information list to the VLC module 455, and the VLC module 455 generates second data including the additional information list. In step 1125, the VLC module 455 transmits the second data to the additional information providing terminal 600 using the terminal ID.

In step 1126, the receiver 602 in the additional information-providing terminal 600 receives the second data. In step 1127, the data processor 603 checks the additional information list included in the second data, and provides the additional information list to the built-in display 605.

In step 1128, the user selects any one additional information in the additional information list through the external input interface 604 in the additional information-providing terminal 600, and the data processor 603 receives the information selected by the user. In step 1129, the data processor 603 checks an ID of additional information corresponding to the selection information. For example, the user may touch a region where any item of additional information in the additional information list is located, using a touch screen module, or may select any item of additional information from the additional information list by shifting a position of a pointer such as a mouse cursor.

Next, the data processor 603 generates a second request message including the additional information ID and the terminal ID in step 1130, and transmits the second request message to the display device 400 in step 1131.

In step 1132, the display device 400 receives the second request message. In step 1133, the additional information manager 445 checks an additional information ID included in the second request message and detects additional information corresponding to the additional information ID. In step 1134, the additional information manager 445 provides the detected additional information to the VLC module 455, and the VLC module 455 generates a third message including the additional information. In step 1135, the VLC module 455 sends the third message to the additional information providing terminal 600 corresponding to the terminal ID.

In step 1136, the receiver 602 in the additional information-providing terminal 600 receives the third message. In step 1137, the data processor 603 checks additional information included in the third message and displays the additional information on the built-in display 605.

In each of the embodiments, upon a change in the scene of video, the display device 400 may update information included in the first data and provide the updated first data to the additional information providing terminal 600. Accordingly, if the scene of video is changed while the user performs a process for receiving additional information, providing additional information may be hindered, or the user may fail to receive the desired additional information. In order to prevent this problem, it is preferable that the data processor 603 in the additional information providing terminal 600 does not display the first data on the built-in display 605 from the time when the user's selection is input to the time when the additional information corresponding to the user's selection is displayed on the built-in display 605.

For this purpose, the first to fifth embodiments of the present invention may further include a process in which the data processor 603 sends a transmission start message for requesting starting transmission of the first data to the display device 400, after the data processor 603 sends a transmission stop message for requesting stopping transmission of the first data at the time when the user's selection is received, and then the additional information is displayed on the built-in display 605. Alternatively, the first to fifth embodiments may further include a process in which the data processor 603 deletes the first data received from the display device 400, from the time when the user's selection is input to the time when the additional information is displayed on the built-in display 605.

As is apparent from the foregoing description, the above-described video's additional information providing method and apparatus can provide, using VLC, additional information related to the object of interest to the user and on the screen that the user is watching using BIFS information. In addition, even for the advertising display board intended for a plurality of users, the present invention can support providing additional information using BIFS information of MPEG.

With use of the display device providing video to a plurality of users, such as an advertising display board, the present invention can efficiently provide additional information desired by a plurality of users through the additional information-providing terminal such as a mobile communication terminal.

While the invention has been shown and described with reference to a certain exemplary embodiments thereof, it will be understood by those skilled in the art that various changes in form and details may be made therein without departing from the spirit and scope of the invention as defined by the appended claims and their equivalents.

What is claimed is:

1. A method for providing additional information related to video displayed on a display device by a terminal communicable with the display device, the method comprising: generating an additional information request message for requesting the additional information corresponding to a selected scene using a scene descriptor identifier, if an object in a scene of the video being displayed on the terminal or the display device is selected by a user; sending, by the terminal, the additional information request message to the display device; receiving, by the terminal, from the display device second data including additional information corresponding to the additional information request message; and displaying the second data on the terminal, wherein the additional information includes an Identifier (ID) indicating a video frame which includes an object, information about a position where the object is presented within the video frame, an ID of the object, a name of the object, and detailed information about the object.

2. The method of claim 1, wherein the video is included in a first data and the first data further includes at least one scene descriptor identifier for identifying the scene and a resolution of the terminal or the display device.

3. The method of claim 2, wherein the additional information request message includes coordinates of a region selected by the user and a scene descriptor identifier at a time corresponding to the selected region.

4. The method of claim 3, wherein the coordinates of a region selected by the user are changed considering the resolution of the display device and a resolution of the terminal so that the selected region is in accord with the resolution of the display device.

5. The method of claim 3, wherein the second data includes the additional information corresponding to coordinates of the region and the time selected by the user.

6. The method of claim 1, further comprising: displaying the selected scene on the terminal for a predetermined time; and sending to the display device a data transmission stop message for requesting stopping transmission of a first data for a predetermined time.

7. The method of claim 1, further comprising: displaying the selected scene on the terminal for a predetermined time; and deleting a first data received for the predetermined time.

8. The method of claim 1, wherein a first data includes an additional information list and additional information identifier related to the video, and the additional information request message includes an identifier of the selected additional information.

9. A terminal communicable with a display device for providing additional information related to video displayed on the display device, the terminal comprising: a communication unit sending an additional information request message generated in response to a selection of an object in a scene of the video by a user, and receiving second data that the display device sends in response to the additional information request message; an input interface for receiving the selection from the user; a processor for generating the additional information request message for requesting additional information corresponding to a selected scene using a scene descriptor identifier, if the object being displayed on the terminal or the display device is selected by the user, and extracting additional information corresponding to the additional information request message from the second data received from the display device; and a display for displaying the extracted additional information, wherein the additional information includes an Identifier (ID) indicating a video frame which includes an object, information about a position where the object is presented within the video frame, an ID of the object, a name of the object, and detailed information about the object.

10. The terminal of claim 9, wherein the video is included in a first data and the first data further includes at least one scene descriptor identifier for identifying the scene and a resolution of the terminal or the display device.

11. The terminal of claim 10, wherein the processor further comprises a coordinate checking unit for changing coordinates considering the resolution of the display device and a resolution of the terminal so that any one region selected by the user is in accord with the resolution of the display device.

12. The terminal of claim 9, wherein the second data includes the additional information corresponding to coordinates of the region and the time selected by the user.

13. The terminal of claim 9, wherein the processor provides for a predetermined time to the terminal, the selected scene, generates a data transmission stop message for requesting stopping transmission of a first data for a predetermined time, and provides the data transmission stop message to the communication unit.

14. The terminal of claim 9, wherein the processor provides the selected scene to the terminal for a predetermined time, and avoids processing a first data received for the predetermined time.

15. The terminal of claim 9, wherein a first data includes an additional information list and at least one additional information identifier related to the video and the processor generates an additional information request message including an identifier of additional information selected by the user in the additional information list.

16. A method for operating additional information related to video displayed on a display device by a terminal communicable with the display device, comprising: generating a first request message including a scene descriptor identifier and a terminal identifier assigned to the terminal if a scene of the video being displayed on the terminal or the display device is selected by a user; sending the first request message to the display device; receiving second data including at least one additional information related to the scene descriptor identifier; and displaying the second data on the terminal, wherein the second data includes a list of additional information related to the scene descriptor identifier, and the method further comprises: receiving from the user at least one item of additional information selected from the list of additional information; sending the display device a second request message including an identifier of the selected item of additional information and the terminal identifier; receiving third data including additional information corresponding to the identifier of the selected item of additional information; and displaying the third data on the terminal, wherein the additional information includes an Identifier (ID) indicating a video frame which includes an object, information about a position where the object is presented within the video frame, an ID of the object, a name of the object, and detailed information about the object.

17. The method of claim 16, further comprising sending the first request message to a region selected from among preset regions on the display device,
wherein the receiving of second data comprises receiving the second data including additional information corresponding to the selected region, and
wherein the displaying of the second data comprises displaying additional information corresponding to the selected region.

18. A terminal communicable with a display device, for providing additional information related to video displayed on the display device, the terminal comprising: an input interface for receiving a selection from a user; a communication unit for sending a first request message generated in response to the selection of an object in a scene of the video from the user, and receiving second data from the display device in response to the first request message; a processor for checking a scene descriptor identifier corresponding to the object in the scene, if the object of the video being displayed on the terminal or the display device is selected by the user, generating a first request message including the checked scene descriptor identifier and a terminal identifier assigned to the terminal, and extracting the at least one additional information from the second data received from the display device; and a display for displaying the at least one additional information, wherein the second data includes a list of additional information related to the scene descriptor identifier, wherein the input interface receives at least one additional information selected from among the list of additional information from the user, wherein the processor provides the list of additional information to the display, generates a second request message including an identifier of additional information selected by the user, provides the second request message to the communication unit, detects the additional information corresponding to the identifier of the selected additional information from third data received through the communication unit, and provides the detected additional information to the display, and wherein the additional information includes an Identifier (ID) indicating a video frame which includes an object, information about a position where the object is presented within the video frame, an ID of the object, a name of the object, and detailed information about the object.

19. The terminal of claim 18, wherein the communication unit sends the first request message to a region selected from among preset regions on the display device in response to an input to the input interface, wherein the processor detects additional information corresponding to the selected region from the second data and provides the additional information to the display.

* * * * *